(12) United States Patent
Nakajima et al.

(10) Patent No.: US 11,745,694 B2
(45) Date of Patent: Sep. 5, 2023

(54) AIRBAG DEVICE, VEHICLE SEAT, AND IGNITION METHOD FOR AIRBAG DEVICE

(71) Applicants: Yutaka Nakajima, Kanagawa (JP); Yoshiki Ito, Kanagawa (JP); Autoliv Development AB, Vargarda (SE)

(72) Inventors: Yutaka Nakajima, Kanagawa (JP); Yoshiki Ito, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/633,424

(22) PCT Filed: Jul. 22, 2020

(86) PCT No.: PCT/JP2020/028355
§ 371 (c)(1),
(2) Date: Feb. 7, 2022

(87) PCT Pub. No.: WO2021/029197
PCT Pub. Date: Feb. 18, 2021

(65) Prior Publication Data
US 2022/0281404 A1 Sep. 8, 2022

(30) Foreign Application Priority Data
Aug. 9, 2019 (JP) .................................. 2019-147073

(51) Int. Cl.
*B60R 21/263* (2011.01)
*B60R 21/015* (2006.01)
(Continued)

(52) U.S. Cl.
CPC ........ *B60R 21/263* (2013.01); *B60R 21/0136* (2013.01); *B60R 21/01552* (2014.10);
(Continued)

(58) Field of Classification Search
CPC ............ B60R 21/263; B60R 21/01552; B60R 21/23138; B60R 21/233;
(Continued)

(56) References Cited

U.S. PATENT DOCUMENTS

| 2006/0119085 A1* | 6/2006 | Masuda | ................... B60R 21/18 |
| | | | 280/733 |
| 2012/0123645 A1* | 5/2012 | Kwon | ................... B60N 2/4235 |
| | | | 280/730.2 |

(Continued)

FOREIGN PATENT DOCUMENTS

| CN | 100402352 C | * 7/2008 | ............. B60R 21/18 |
| CN | 107199979 A | 9/2017 | |

(Continued)

OTHER PUBLICATIONS

I. Nagasawa, JP 2019-177791A Occupant protection device for vehicle, Machine English Translation, ip.com (Year: 2019).*

(Continued)

*Primary Examiner* — Karen Beck
(74) *Attorney, Agent, or Firm* — Harness, Dickey & Pierce, P.L.C.; Stephen T. Olson

(57) ABSTRACT

For example, even when an occupant is seated offset in a left-right direction, an airbag is reliably expanded and deployed. An airbag device contains: an airbag that protects at least a side portion of a shoulder region, upper arm region, and chest region of an occupant seated on a vehicle seat; and an inflator that supplies gas to the airbag. The airbag has a pair of side part protection chambers that are housed on at least both left and right sides of the vehicle seat. The side part protection chambers, when expanded and deployed, expand and deploy forward independently from both left and right sides of the vehicle seat. A pair of the inflators are provided to allow gas to be supplied to each side part (Continued)

protection chamber, and the ignition timing of the inflators can be controlled separately.

16 Claims, 14 Drawing Sheets

(51) Int. Cl.
  *B60R 21/0136* (2006.01)
  *B60R 21/231* (2011.01)
  *B60R 21/233* (2006.01)
(52) U.S. Cl.
  CPC ...... *B60R 21/233* (2013.01); *B60R 21/23138* (2013.01); *B60R 2021/23107* (2013.01); *B60R 2021/23146* (2013.01)
(58) Field of Classification Search
  CPC ........... B60R 2021/23107; B60R 2021/23146; B60R 21/207; B60R 21/01512; B60R 2021/0044; B60R 2021/0048; B60R 2021/26029
  See application file for complete search history.

(56) References Cited

U.S. PATENT DOCUMENTS

| | | | | |
|---|---|---|---|---|
| 2014/0042733 | A1* | 2/2014 | Fukawatase | B60R 21/0136 280/730.2 |
| 2015/0197209 | A1* | 7/2015 | Fujiwara | B60R 21/231 280/730.1 |
| 2018/0194317 | A1* | 7/2018 | Barbat | B60R 21/207 |
| 2019/0054890 | A1* | 2/2019 | Kwon | B60R 21/23138 |
| 2021/0370861 | A1* | 12/2021 | Matsushita | B60R 21/263 |

FOREIGN PATENT DOCUMENTS

| | | | | |
|---|---|---|---|---|
| CN | 108297819 A | | 7/2018 | |
| CN | 109421650 A | | 3/2019 | |
| DE | 19812830 A1 | * | 9/1999 | ........... B60R 21/015 |
| DE | 102019116564 A1 | * | 12/2019 | ........... B60R 21/207 |
| DE | 102022112988 A1 | * | 12/2022 | ........... B60R 21/207 |
| EP | 3805053 A1 | * | 4/2021 | ........... B60R 21/207 |
| JP | 2014-34356 A | | 2/2014 | |
| JP | 2016-185715 A | | 10/2016 | |
| JP | 2017-170941 A | | 9/2017 | |
| JP | 2017-185973 A | | 10/2017 | |
| JP | 2018-83554 A | | 5/2018 | |
| JP | 2019-14351 A | | 1/2019 | |
| JP | 2019-14477 A | | 1/2019 | |
| JP | 2019-34710 A | | 3/2019 | |
| JP | 2019177791 A | * | 10/2019 | |
| KR | 10-2008-0080968 A | | 9/2008 | |
| KR | 20080080968 A | | 9/2008 | |
| KR | 20200130765 A | * | 11/2020 | |
| WO | WO-0021797 A1 | * | 4/2000 | ........... B60R 21/207 |
| WO | WO-2020141737 A1 | * | 7/2020 | |

OTHER PUBLICATIONS

Jung et al. KR 2020-0130765, Airbag apparatus of vehicle, Machine English Translation, ip.com (Year: 2020).*
Office Action received in corresponding Chinese Patent Application 202080051978.4, dated Apr. 14, 2023 with translation.

* cited by examiner

[FIG. 1]
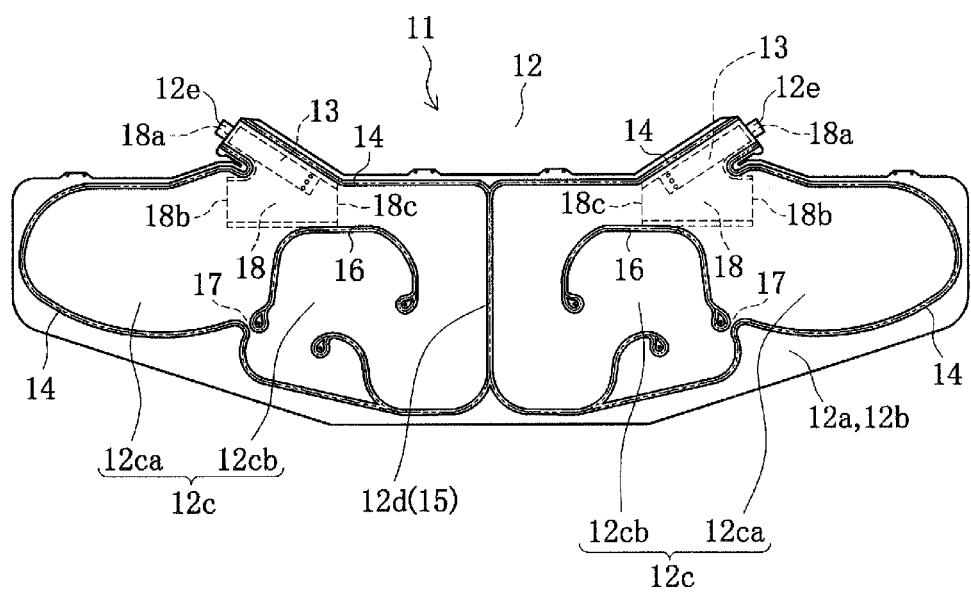

[FIG. 2]
(a)
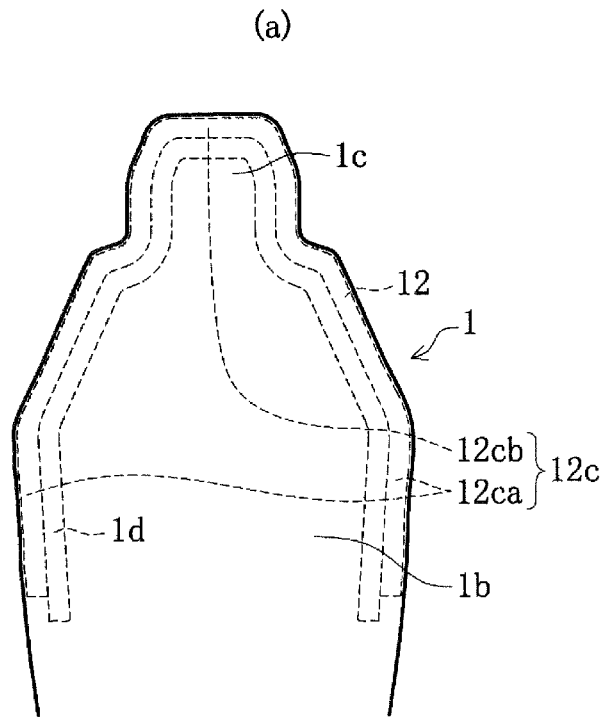
(b)
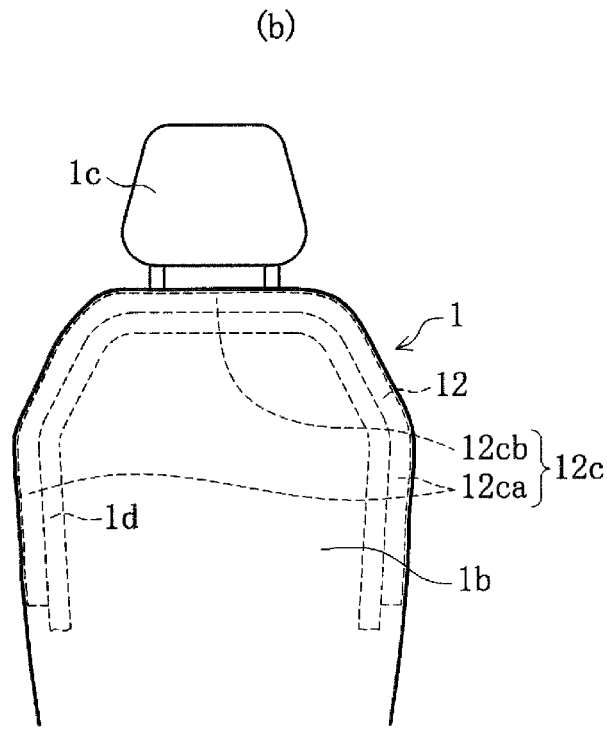

[FIG. 3]
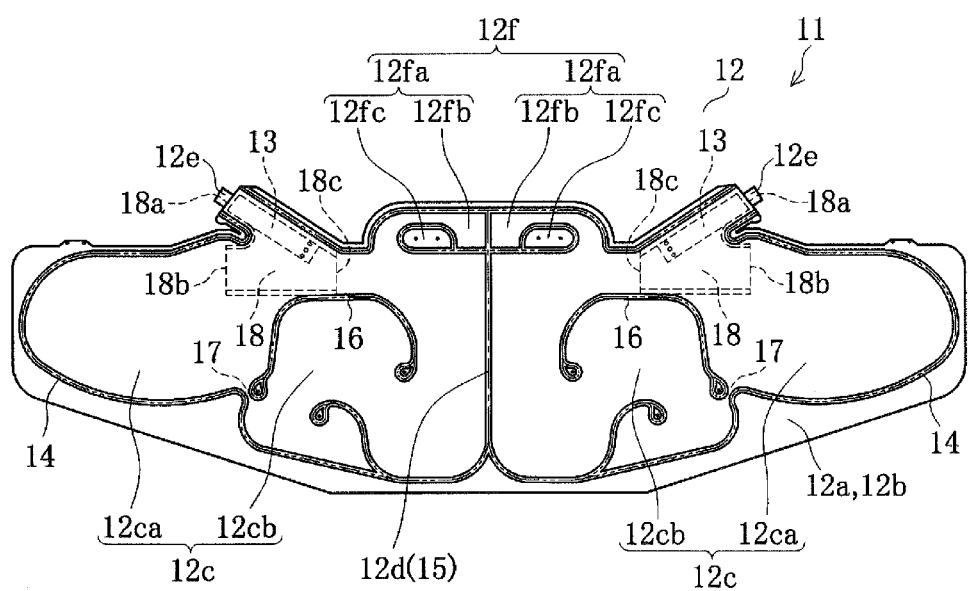

[FIG. 4]
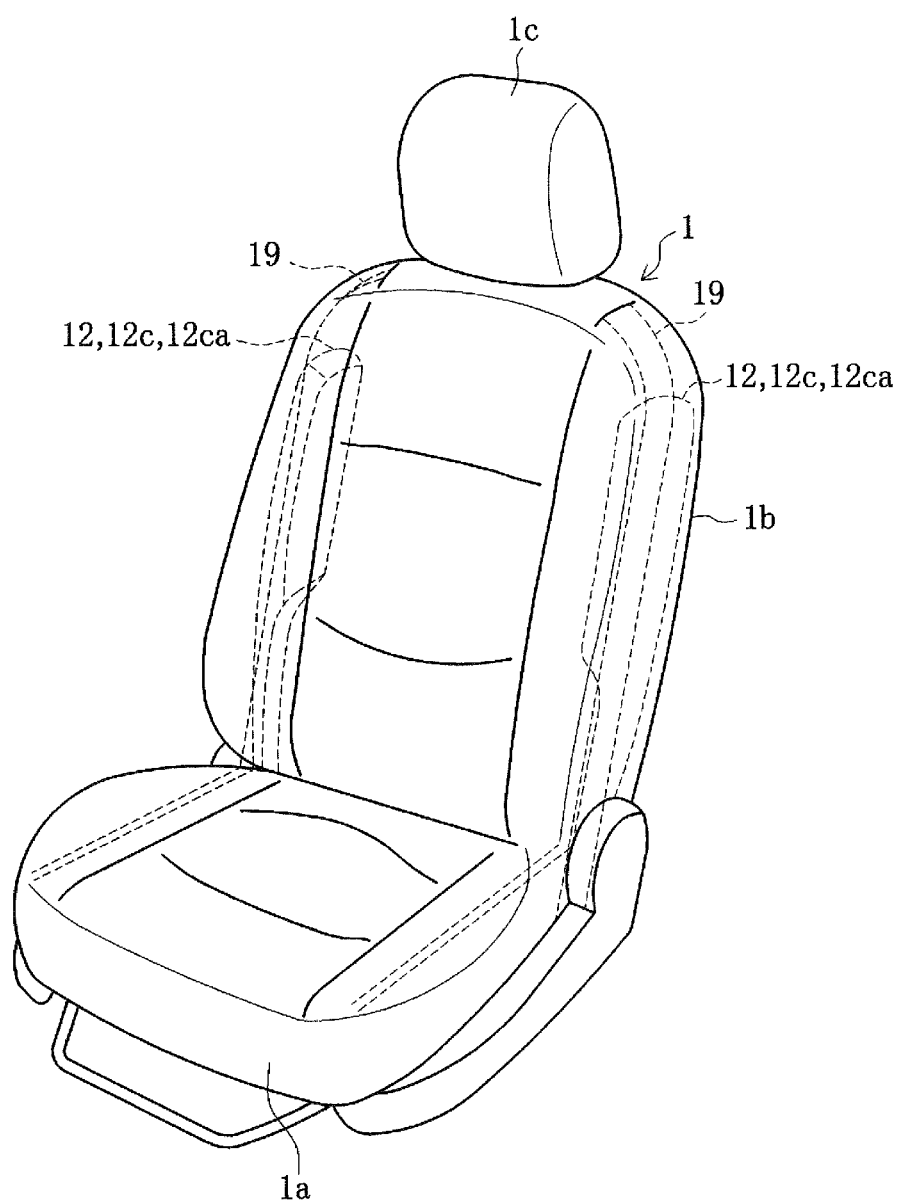

[FIG. 5]
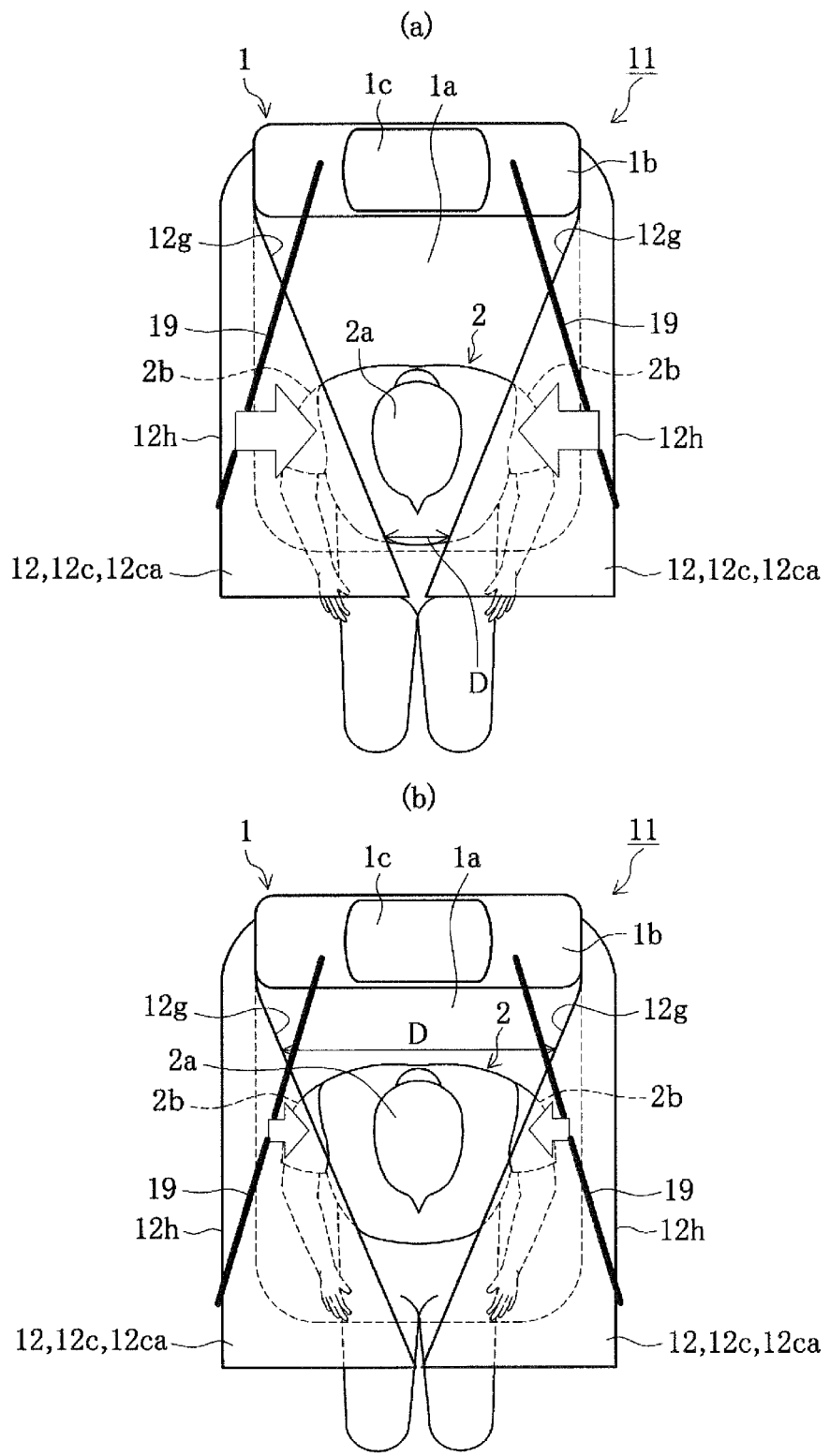

[FIG. 6]
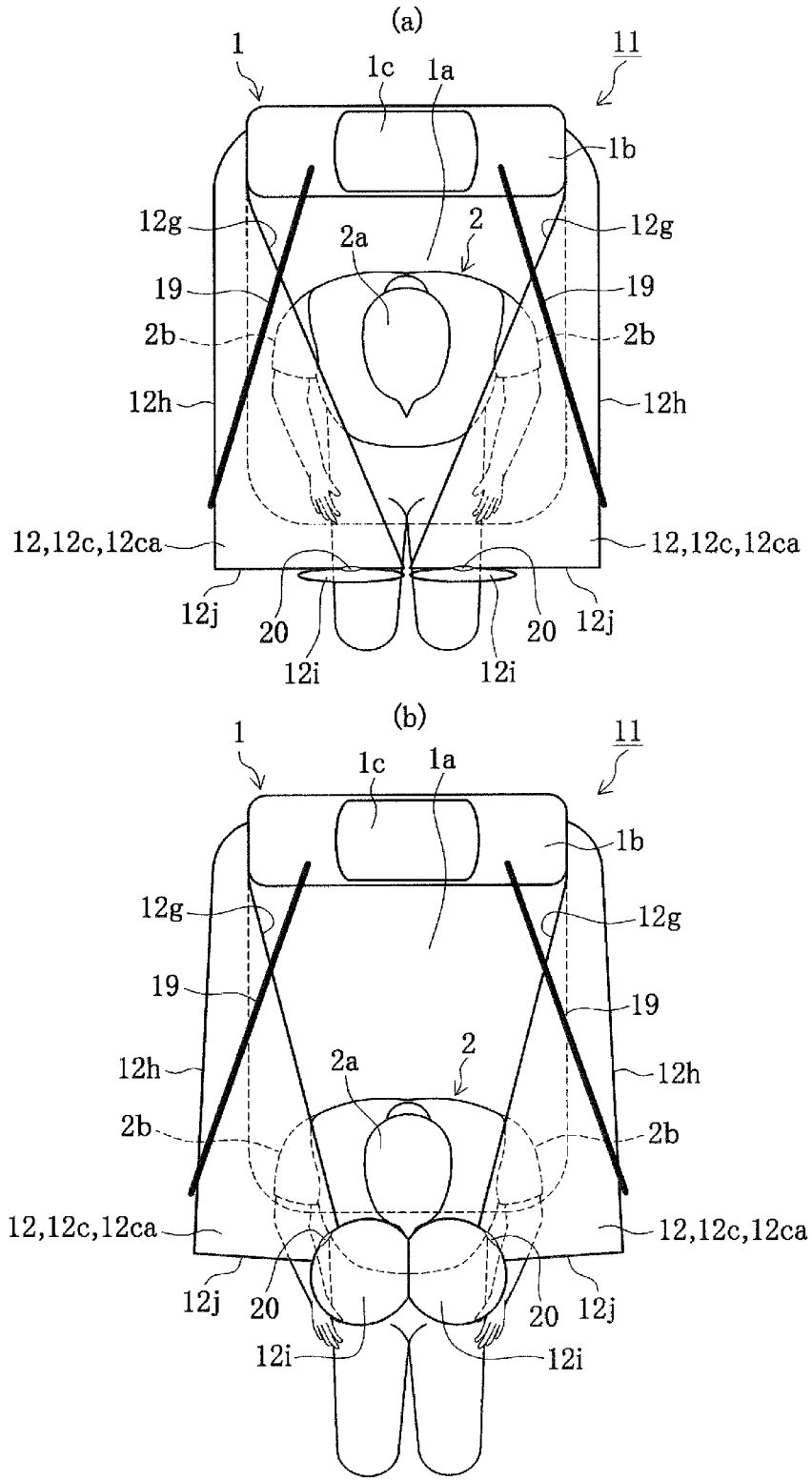

[FIG. 7]
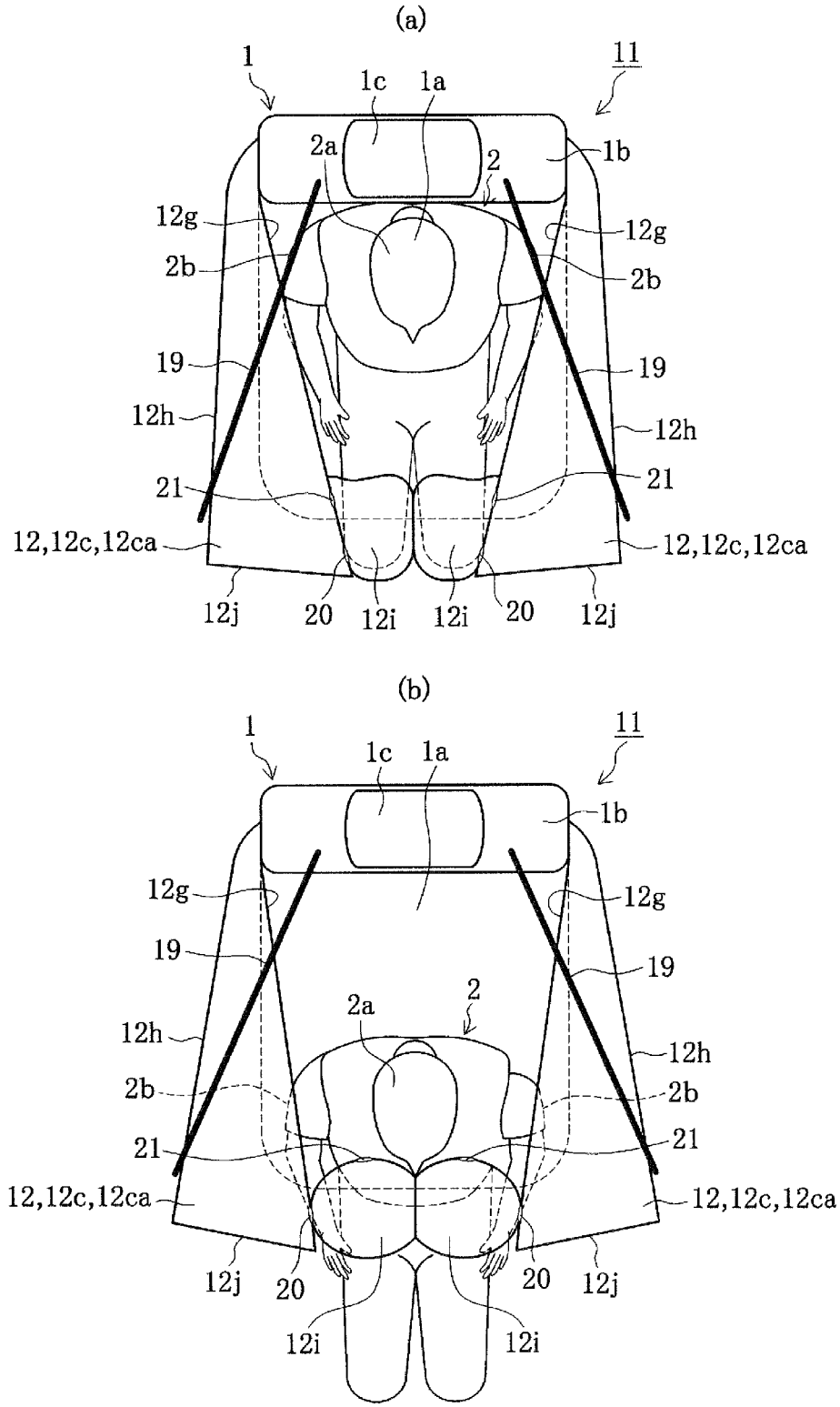

[FIG. 8]
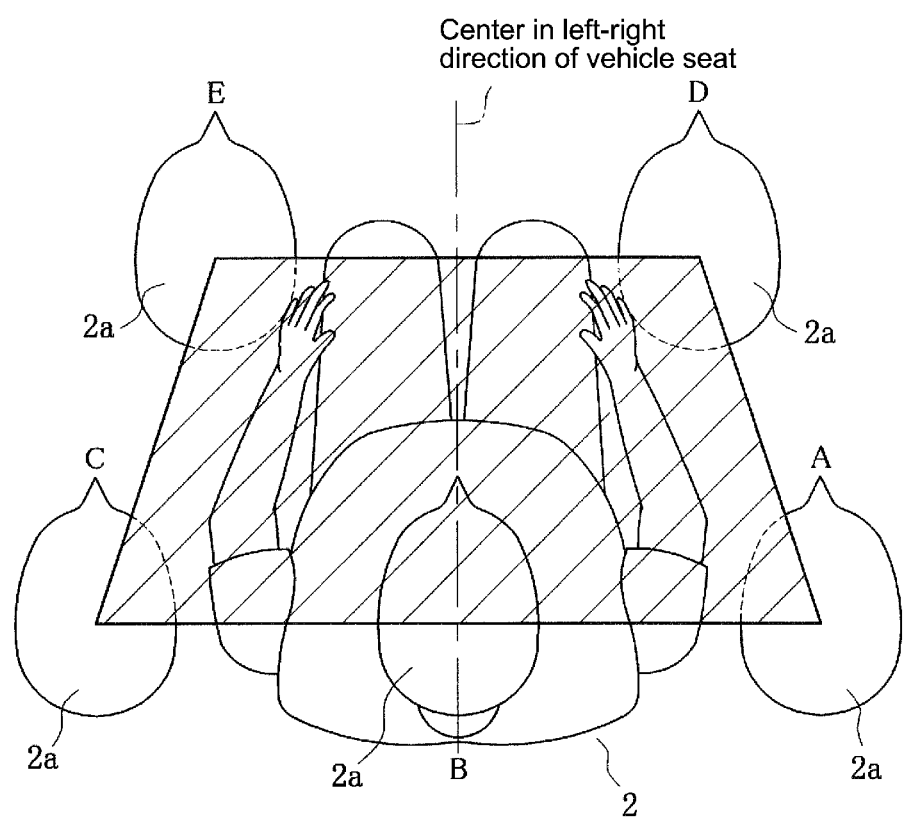

[FIG. 9]
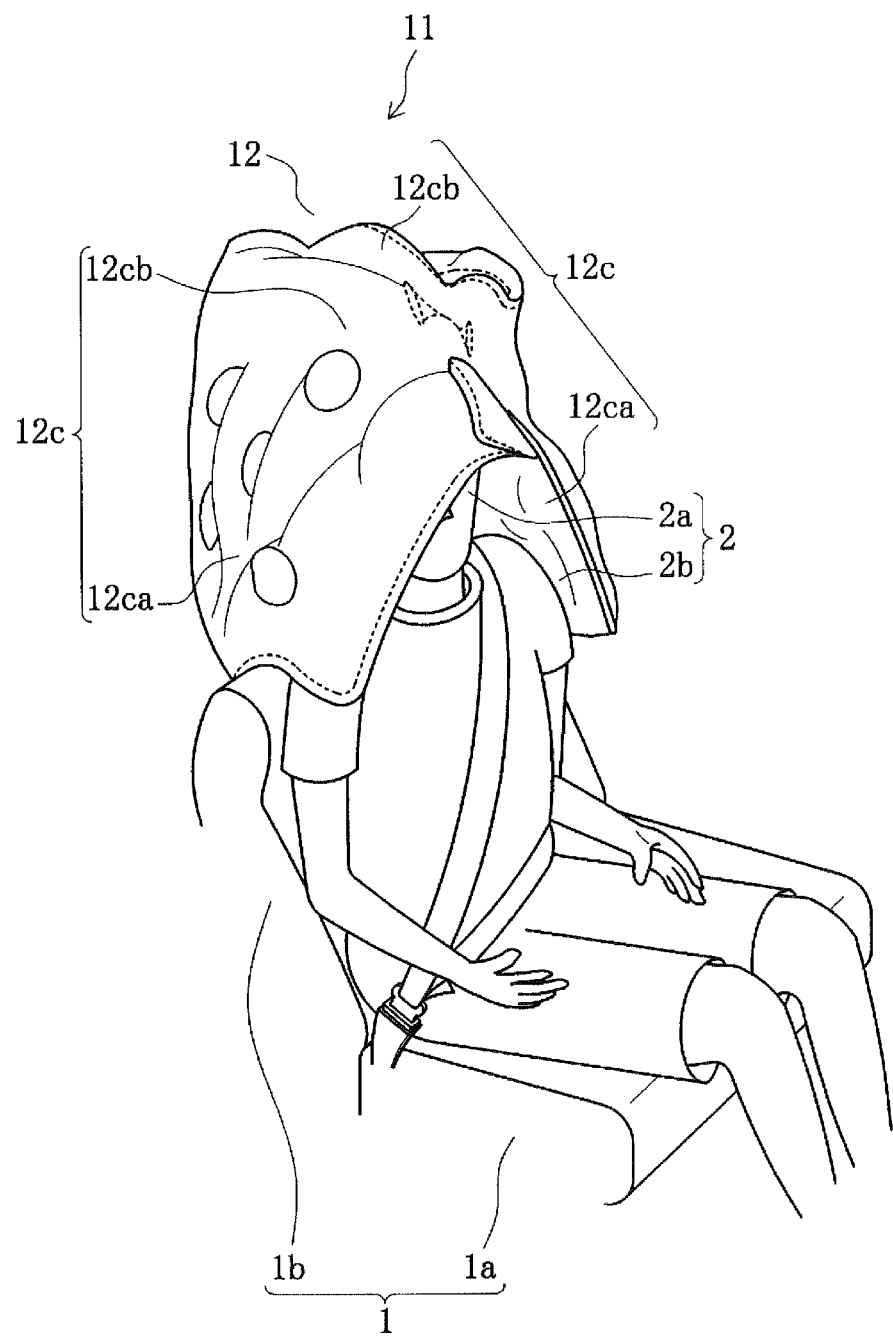

[FIG. 10]
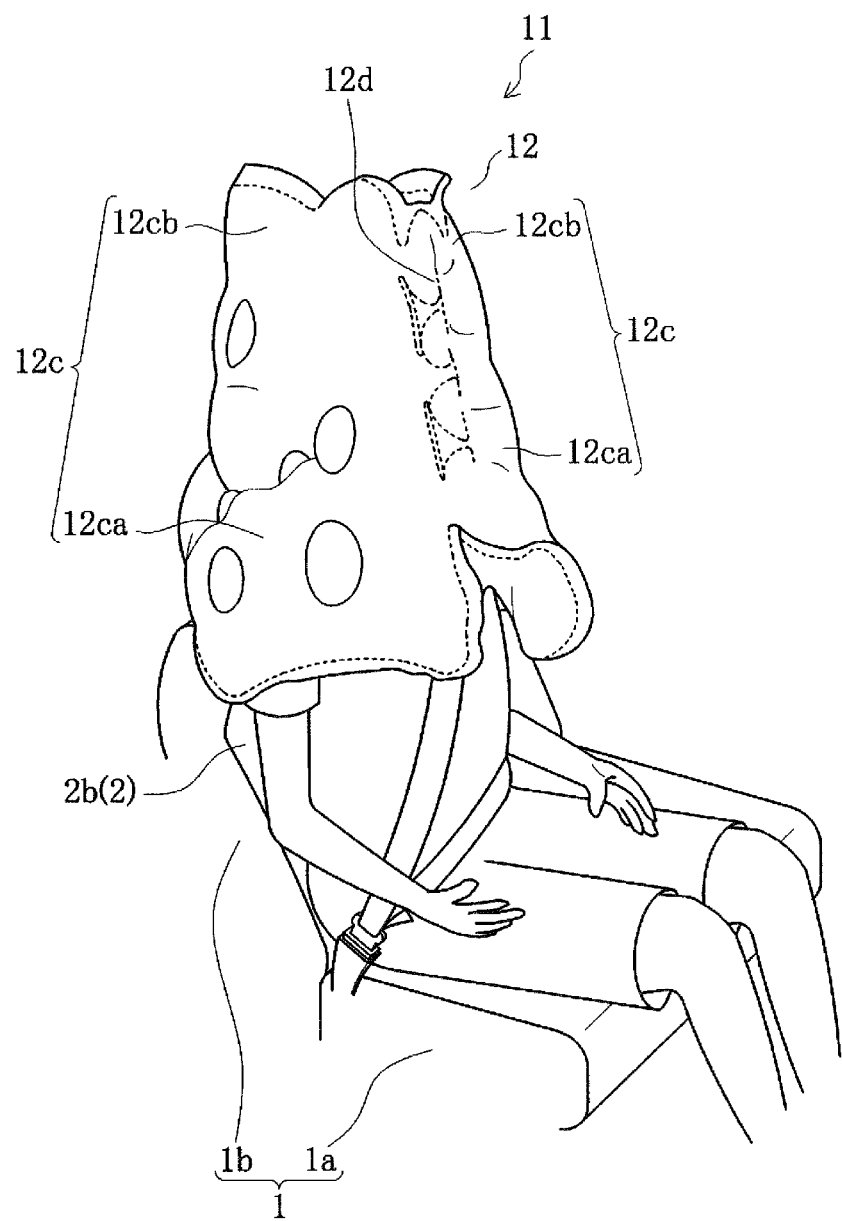

[FIG. 11]
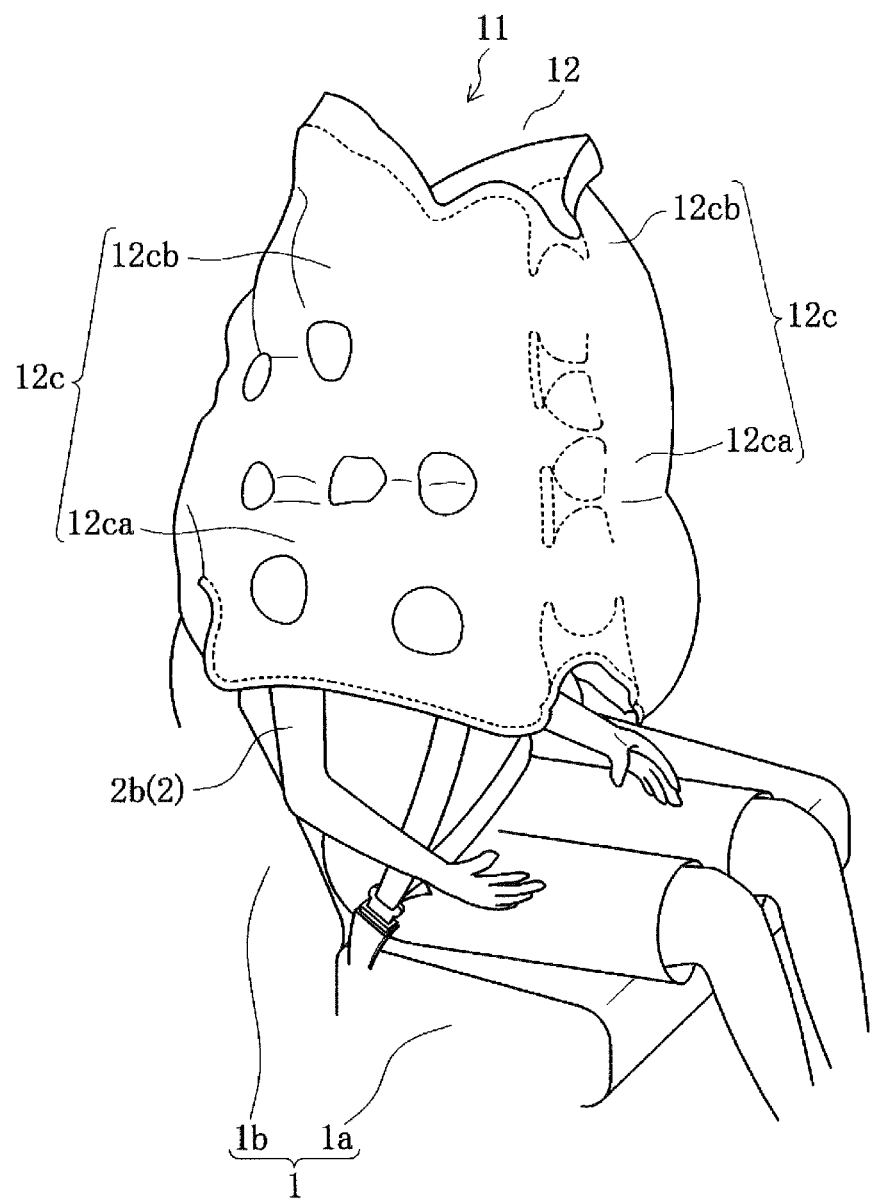

[FIG. 12]
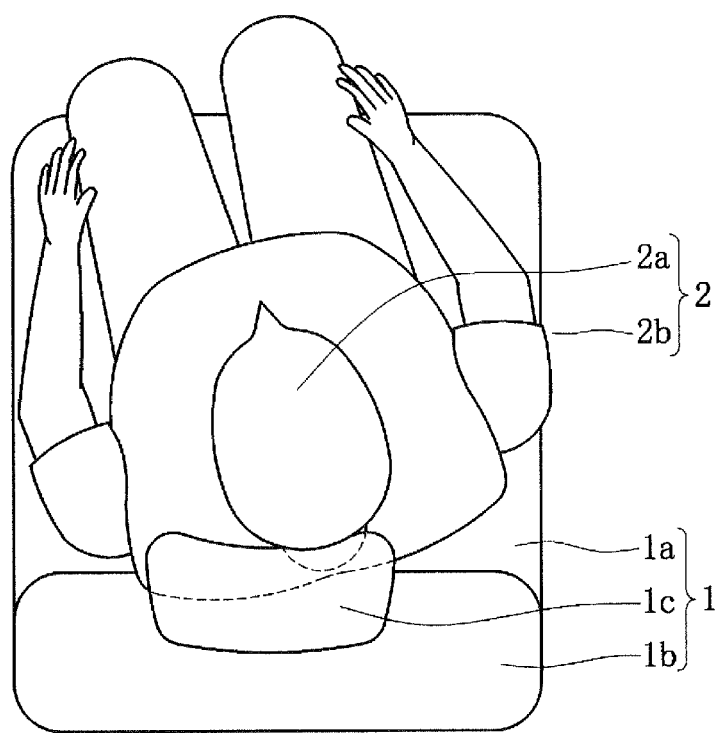

[FIG. 13]
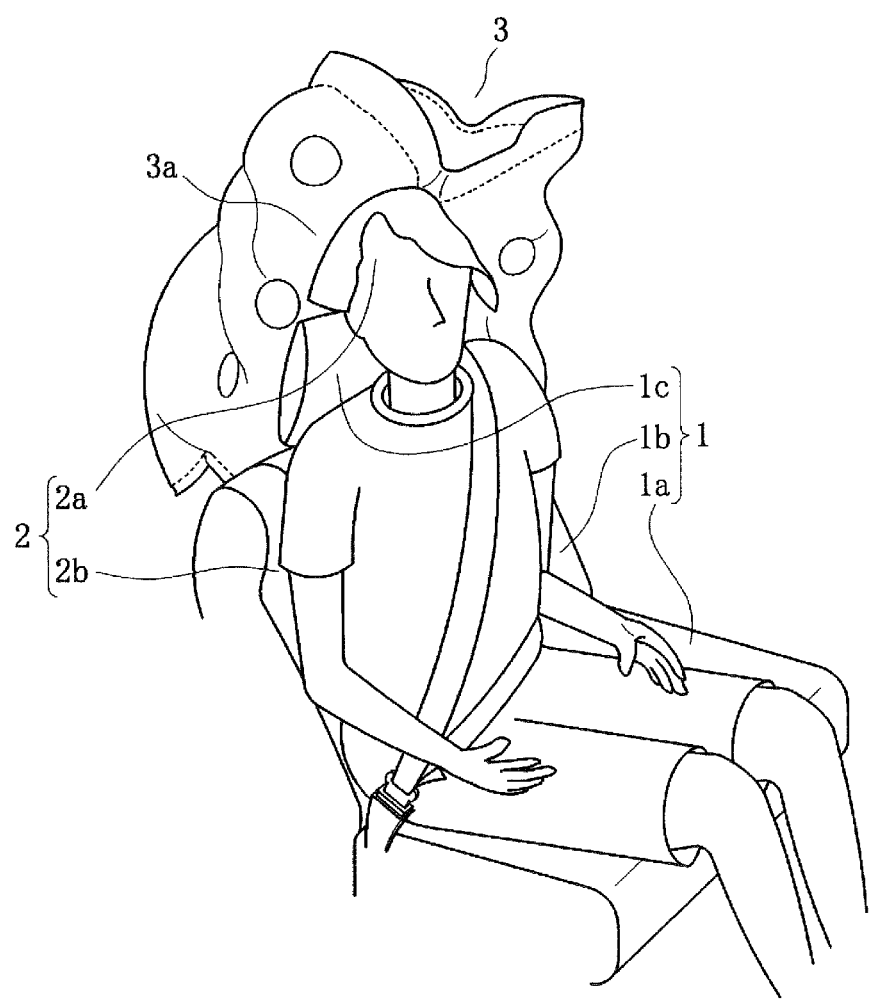

[FIG. 14]
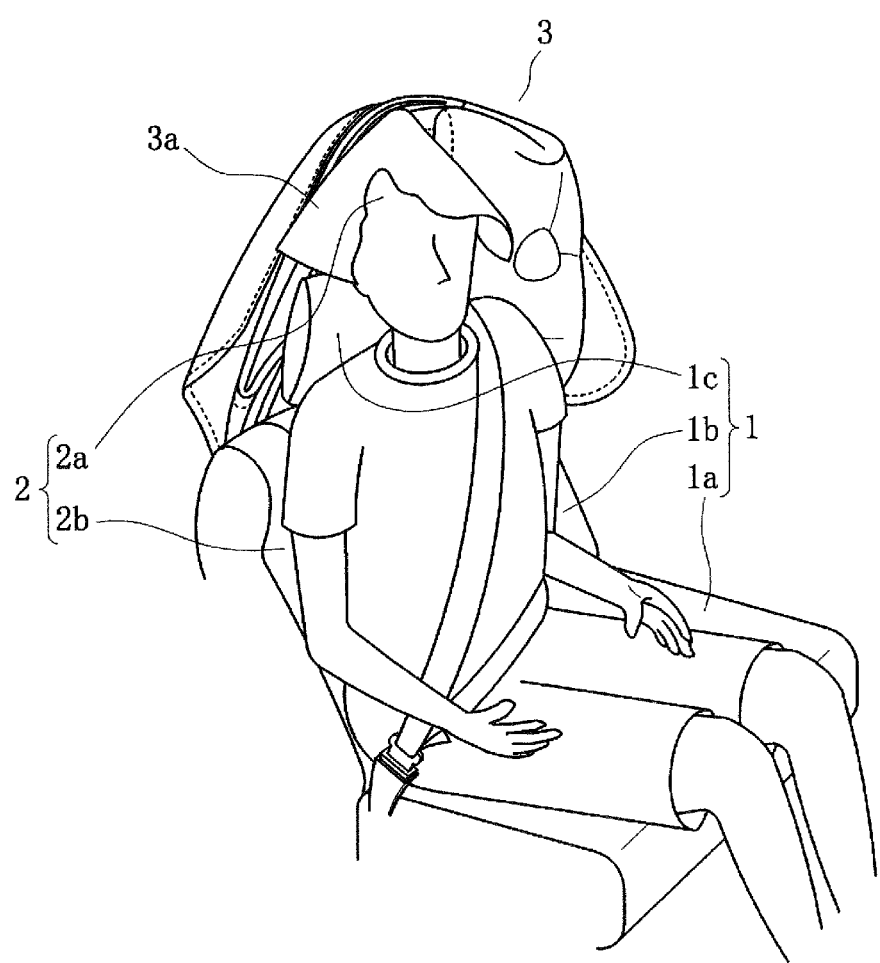

AIRBAG DEVICE, VEHICLE SEAT, AND IGNITION METHOD FOR AIRBAG DEVICE

TECHNICAL FIELD

The present invention relates to: an airbag device that protects, for example, at least a side portion of a shoulder region, upper arm region, and chest region of an occupant, and in some cases, a side portion of the abdomen region and waist region of the occupant, in the event of a vehicle collision; a vehicle seat provided with the airbag device; and a method of igniting the airbag device.

Hereinafter, in the present application, "up" and "above" refer to a head region direction of an occupant seated in a regular position in a vehicle seat, and "down" and "below" refer to a foot direction of the occupant. Furthermore, "front" and "forward" refer to a front surface direction of the occupant seated in the regular position, while "rear" and "rearward" refer to a back surface direction of the occupant. Furthermore, "left" and "left side" refer to a left-hand direction of the occupant seated in the regular position, while "right" and "right side" refer to the right-hand direction of the occupant. Note that "regular position" of the vehicle seat refers to a seating position along which the entire back of the occupant is in contact with a seatback included on the vehicle seat at a center position in a left-right direction of a seat cushion included on the vehicle seat.

BACKGROUND TECHNOLOGY

In recent years, for example, airbag devices have been proposed in which a hood-shaped (shell-shaped) airbag ejects from a vehicle seat to cover and protect a head region of an occupant and a side portion of a shoulder region, upper arm region, and chest region of the occupant in the event of a vehicle collision (for example, Patent Documents 1 and 2).

The airbag devices include an airbag device in which a hood-shaped airbag is expanded and deployed by a single inflator (for example, Patent Document 1) and an airbag device in which a left side portion and right side portion of the airbag are expanded and deployed by separate inflators (for example, Patent Document 2).

In the airbag device using a single inflator to expand and deploy a hood-shaped airbag, a left side portion and right side portion of the airbag are simultaneously expanded and deployed. Furthermore, the basis of the airbag device using separate inflators to expand and deploy the left side portion and right side portion of the airbag is that the separate inflators are ignited at the same timing to simultaneously expand and deploy the left side portion and right side portion of the airbag. Thus, simultaneous expansion and deployment of the left side portion and right side portion of the airbag is based on the premise that the occupant is seated in the vehicle seat in a regular state. The "regular state" as referred to herein is not limited to being seated in a regular position, but also includes being seated in the left-right direction within a predetermined distance from the regular position, or being moved in the left-right direction, forward or diagonally forward within a predetermined distance from the regular position due to a collision or the like.

However, the occupant may not always be seated in the vehicle seat in the regular state, and may be seated offset in the left-right direction from the regular state. Furthermore, even when the occupant is seated in the vehicle seat in the regular state, the occupant may move from the regular state in the left-right direction, forward or diagonally forward before the airbag expands and deploys, due to a vehicle collision or the like.

For example, as illustrated in FIG. 12, when an occupant 2 is seated on a right side of a seat, and when a left side portion and right side portion of an airbag 3 simultaneously expand and deploy, a right side airbag portion 3a may get caught on a head region 2a of the occupant 2 (see FIG. 13). In this case, the airbag 3 does not reliably expand and deploy, and the head region 2a of occupant 2 and a side portion 1b [sic] of a shoulder region, upper arm region, and chest region of the occupant 2 cannot be properly protected, as illustrated in FIG. 14. Note that in FIG. 12 to FIG. 14, 1 indicates a vehicle seat, 1a indicates a seat cushion, 1b indicates a seatback, and 1c indicates a headrest.

PRIOR ART DOCUMENTS

Patent Documents

[Patent Document 1] Japanese Unexamined Patent Application 2019-14477

[Patent Document 2] Japanese Unexamined Patent Application 2018-83554

SUMMARY OF THE INVENTION

Problem to be Solved by the Invention

A problem to be solved by the present invention is that if left and right inflators are simultaneously ignited, the airbag may not reliably expand and deploy when an occupant is seated offset in a left-right direction from a regular state, or when the occupant moves in the left-right direction or the like from the regular state.

Means for Solving the Problems

In view of the foregoing, an object of the present invention is to ensure that an airbag expands and deploys even when an occupant is seated offset in a left-right direction from a regular state, or when the occupant moves in the left-right direction or the like from the regular state due to a collision or the like.

The present invention is an airbag device including an airbag that protects at least a side portion of a shoulder region, upper arm region, and chest region of an occupant seated on a vehicle seat and an inflator that supplies gas to the airbag, and has the following configurations as main features.

The airbag has a pair of side part protection chambers that are housed on at least both left and right sides of the vehicle seat.

Furthermore, the side part protection chambers, when expanded and deployed, expand and deploy forward independently from both the left and right sides of the vehicle seat.

Furthermore, a pair of inflators are provided so as to provide gas to the respective side part protection chambers of the airbag, and are controlled so as to be ignited at a different timing.

The airbag may further include a head region protection chamber that expands and deploys from above the side part protection chambers that protects the side portion of the occupant so as to wrap around an upper end edge portion of a seatback of the vehicle seat in the vicinity of the upper end edge portion to protect the head region of the occupant.

Alternatively, the pair of side part protection chambers of the airbag may have a shape in which the distance between the occupant side surfaces narrows toward the front when viewed from above during expansion and deployment.

Alternatively, the pair of side part protection chambers of the airbag may further include an extension chamber leading from the side part protection chamber that protects the side portion of the occupant to the front of the occupant.

Alternatively, the pair of side part protection chambers of the airbag may be physically connected via a coupling part.

In the airbag device of the present invention, the pair of side part protection chambers are arranged separated but facing each other on both the left and right sides of the vehicle seat, and are housed in the vehicle seat in a rolled state or folded state. This is a vehicle seat of the present invention.

The airbag device of the present invention ignites an inflator at the following timing.

When an occupant state detection sensor detects that an occupant is seated in the vehicle seat offset to the left side from the regular state The inflator disposed on the left side of the vehicle seat is ignited at an earlier timing than the inflator disposed on the right side.

When an occupant state detection sensor detects that an occupant is seated in the vehicle seat offset to the right side from the regular state The inflator disposed on the right side of the vehicle seat is ignited at an earlier timing than the inflator disposed on the left side.

When an occupant state detection sensor detects that an occupant is seated in the vehicle seat in the regular state The inflator disposed on the right side of the vehicle seat and the inflator disposed on the left side are ignited at the same timing.

When a collision detection sensor detects a collision from a side outside the vehicle and determines that the collision will cause the occupant to move to a position that is offset in the left-right direction from the regular state when the airbag is expanded and deployed The inflator on the collision side of the vehicle seat is ignited at an earlier timing than the inflator on the opposite side in the left-right direction from the collision side.

When a collision detection sensor detects a collision from diagonally forward outside the vehicle and determines that the collision will cause the occupant to move to a position that is offset diagonally forward from the regular state when the airbag is expanded and deployed The inflator on the collision side of the vehicle seat is ignited at an earlier timing than the inflator on the opposite side in the left-right direction from the collision direction.

Control of the inflator ignition timing is controlled by an ECU (Electronic Control Unit), which controls airbag expansion and deployment based on signals output from a plurality of various sensors mounted in the vehicle.

In the present invention, even if a seating position of an occupant in a vehicle seat is offset in the left-right direction from the regular state, or if the occupant moves to an offset position from the regular state due to a collision or the like, an airbag portion on the offset side will not catch on the occupant in an initial stage of expansion and deployment.

Effect of the Invention

In the present invention, an airbag can be reliably deployed even if a seating position of an occupant in the vehicle seat is offset in the left-right direction from the regular state, or if the occupant moves to an offset position from the regular state due to a collision or the like. Therefore, at least a side portion of a shoulder region, upper arm region, and chest region of an occupant can be properly covered, thereby improving safety.

BRIEF DESCRIPTION OF THE DRAWINGS

FIG. 1 is a diagram illustrating an unfolded state of Embodiment 1 of an airbag device of the present invention, in which an airbag is laid flat prior to folding.

FIG. 2 is diagram of a vehicle seat of the present invention to which the airbag device of the present invention is mounted, as viewed from the rear of a vehicle, where (a) illustrates a headrest integrally formed with the backrest part and (b) illustrates a headrest separately mounted to the backrest part of the vehicle seat.

FIG. 3 is a diagram illustrating an unfolded state of Embodiment 2 of an airbag device of the present invention, in which an airbag is laid flat prior to folding.

FIG. 4 is a perspective view illustrating the vehicle seat of the present invention to which Embodiment 3 of the airbag device of the present invention is mounted.

FIG. 5 is a diagram of a state of an airbag of Embodiment 3 of the airbag device of the present invention when expansion and deployment are completed, as viewed from above, where (a) illustrates a large impact in a frontal collision and (b) illustrates a small impact in a frontal collision.

FIG. 6 is a diagram of an airbag of Embodiment 4 of the airbag device of the present invention in an expanded and deployed state, as viewed from above, where (a) illustrates when only a chamber is expanded and deployed and (b) illustrates when an extension chamber is also expanded and deployed.

FIG. 7 is a diagram of an airbag of Embodiment 5 of the airbag device of the present invention in an expanded and deployed state, as viewed from above, where (a) illustrates a state prior to an occupant moving forward immediately after expansion and deployment and (b) illustrates a state after the occupant moves forward after expansion and deployment.

FIG. 8 is a diagram describing a method of igniting an airbag device according to the present invention.

FIG. 9 is a diagram illustrating a state of an airbag of the airbag device of the present invention ignited by the method of the present invention, during an initial stage of expansion and deployment, when a seating position of an occupant in a vehicle seat is offset to a right side from a regular state.

FIG. 10 is a diagram illustrating a state of an airbag of the airbag device of the present invention ignited by the method of the present invention, during an intermediate stage of expansion and deployment, when a seating position of an occupant in a vehicle seat is offset to a right side from a regular state.

FIG. 11 is a diagram illustrating a state of an airbag of the airbag device of the present invention ignited by the method of the present invention when expansion and deployment are completed, when a seating position of an occupant in a vehicle seat is offset to a right side from a regular state.

FIG. 12 is a diagram of an occupant seated at a position offset to the right side from a regular state, as viewed from above the vehicle seat.

FIG. 13 is a diagram illustrating a state of an airbag during an initial stage of expansion and deployment with a left side portion and right side portion of the airbag simultaneously expanded and deployed, when a seating position of an occupant in a vehicle seat is offset to a right side from a regular state.

FIG. 14 is a diagram illustrating a state of an airbag when expansion and deployment are completed when a left side portion and right side portion of the airbag are simultaneously expanded and deployed, and a seating position of an occupant in a vehicle seat is offset to a right side from a regular state.

MODE FOR CARRYING OUT THE INVENTION

For example, if the seating position of an occupant in a vehicle seat is offset in a left-right direction from a regular state, igniting left and right inflators at the same timing may prevent an airbag from reliably expanding and deploying.

The present invention solves the aforementioned problem by optimally controlling ignition timings of a pair of inflators that supply gas to the left side and right side part protection chambers of an airbag having a pair of side part protection chambers housed on at least both left and right sides of a vehicle seat.

EMBODIMENTS

Embodiments of the present invention will be described hereinafter using FIG. 1 to FIG. 11.

Embodiment 1 of Airbag Device and Vehicle Seat: FIG. 1 and FIG. 2

An airbag device 11 of the present invention includes, for example, an airbag 12 that covers a head region 2a and a side portion 2b of a shoulder region, upper arm region, and chest region of an occupant 2 seated in a vehicle seat 1, and a cylindrical inflator 13 that ejects gas into the airbag 12 from an outer side surface thereof.

The vehicle seat 1 has a seat cushion 1a and a seatback 1b, and a headrest 1c is integrally formed in an upper part of the seatback 1b (see FIG. 2(a)) or separately mounted (see FIG. 2(b)). The seat cushion 1a and seatback 1b are supported by a frame 1d.

The airbag 12 has a shape where a left-right direction is longer than an up-down direction. Furthermore, two identical sheets 12a, 12b are overlaid and stitches 14, 15 are formed at an outer peripheral portion and center portion in the left-right direction to form expandable chambers 12c on both left and right sides.

In other words, the stitch 15 in the center portion in the left-right direction physically connects the left and right chambers 12c, and the stitch 15 is referred to as a coupling part 12d hereinafter.

Furthermore, the left and right chambers 12c are demarcated by a stitch 16 into side part protection chambers 12ca positioned on left and right end portion sides of the airbag 12, and a head region protection chamber 12cb positioned on the center portions of the left and right portions of the airbag 12.

In FIG. 1, a ventilating port 17 is formed between the side part protection chambers 12ca and head region protection chamber 12cb by not allowing an end side of the stitch 16 to connect with the stitch 14 on the outer peripheral portion. When expansion of the side part protection chamber 12ca is completed, the ventilating port 17 supplies gas to the head region protection chamber 12cb by gas flowing from the side part protection chambers 12ca to the head region protection chamber 12cb.

Furthermore, in FIG. 1, an insertion portion 12e for the inflator 13 is formed in each of the left and right chambers 12c of the airbag 12, and the inflators 13 are inserted into insertion portions 12e. Furthermore, gas can be supplied from the inflators 13 to the left and right chambers 12c, such that the left and right chambers 12c have a fluidly independent configuration.

Furthermore, in FIG. 1, the insertion portion 12e is provided with a gas guide 18 formed in a substantial Y-shape. The gas guide 18 is provided with an inlet port 18a where the inflator 13 is inserted, a first outlet port 18b that guides gas ejected from the inflator 13 into the side part protection chambers 12ca, and a second outlet port 18c that guides the gas into the head region protection chamber 12cb. A cross-sectional area of the first outlet port 18b and second outlet port 18c are appropriately determined based on an amount of gas supplied to the side part protection chambers 12ca and head region protection chamber 12cb.

The airbag device 11 is housed in the vehicle seat 1 in a rolled state or state folded into a bellows shape, and in this case, the side part protection chambers 12ca are arranged separated but facing each other on both left and right sides of the vehicle seat 1, for example, the seatback 1b.

In the case of a vehicle seat 1 of the present invention in which the airbag device 11 of the present invention is housed in the aforementioned state, for example, in the event of a collision, a collision signal is input from a collision detection sensor (not shown) to an ECU (not shown), and an ignition signal is output from the ECU to the inflator 13. Upon receiving the ignition signal, the inflator 13 ejects gas to expand and deploy the side part protection chambers 12ca forward independently from both left and right sides of the vehicle seat 1. The collision detection sensor may be a satellite sensor (not shown) used for normal airbag deployment control, an acceleration sensor in the ECU described above, or the like.

Furthermore, in conjunction with the expansion and deployment of the side part protection chamber 12ca, the head region protection chamber 12cb expands and deploys from above the side part protection chambers 12ca so as to wrap around an upper end edge portion of the seatback 1b in the vicinity of the upper end edge portion.

Embodiment 2 of Airbag Device: FIG. 3

The airbag device 11 of the present invention is not limited to the configuration illustrated in FIG. 1 but can also include a guide 12f on an upper center portion of the airbag 12, as illustrated in FIG. 3. The guide 12f has two sub-regions 12 fa including an expansion region 12fb and a non-expansion region 12fc, respectively, with the coupling part 12d interposed therebetween. Furthermore, in an early stage expansion and deployment of the airbag 12, the two expansion regions 12fb expand before the chamber 12c, pulling the airbag 12 away from the seatback 1b and ensuring that the chamber 12c can expand.

Embodiment 3 of the Airbag Device and Embodiment 2 of the Vehicle Seat: FIG. 4 and FIG. 5

The airbag device 11 described in FIG. 1 and FIG. 3 includes the coupling part 12d that physically connects the pair of chambers 12c that are disposed on both left and right sides of the seatback 1b. The chamber 12c has both the side part protection chambers 12ca and the head region protection chamber 12cb.

In contrast, the airbag device 11 illustrated in FIGS. 4 and 5 does not have the coupling part 12d that physically connects the pair of chambers 12c, and the chamber 12c does not have the head region protection chamber 12cb. In other words, the airbag device 11 of the present invention illustrated in FIG. 4 and FIG. 5 includes two airbags 12 having the chamber 12c provided only with the side part protection chambers 12ca and an inflator (not shown in FIG. 4 and FIG. 5) that supplies gas to the chamber 12c.

In a rolled state or a state folded into a bellows shape, the airbags 12 are housed in the seatback 1b of the vehicle seat 1, as illustrated in FIG. 4, so as to be separated but facing each other (vehicle seat of present invention)

Furthermore, when viewed, for example, from above in a state where expansion and deployment due to a collision or the like is completed, the airbag 12 is formed in a shape where an interval D between surfaces 12g opposing the side portion 2b of the occupant 2 becomes narrower toward the front of the vehicle, as illustrated in FIG. 5.

In the case of the airbag 12 having this shape, when an impact during a frontal collision is large, the amount of forward movement of the occupant 2 is large. However, the interval D between the surfaces 12g of the airbag 12 becomes narrower toward the front of the vehicle. Therefore, a force of restraining the occupant 2 increases toward the front of the vehicle, and thus more reliable restraint is possible (see FIG. 5(a)).

On the other hand, when the impact during a frontal collision is small, the amount of forward movement of the occupant 2 is small, and the interval D between the surfaces 12g of the airbag 12d becomes wider. Therefore, a force of restraining the occupant 2 decreases, and thus safety increases (see FIG. 5(b)).

In FIG. 4 and FIG. 5, 19 is a tension cloth that is stowed across the seatback 1b to the seat cushion 1a. During expansion and deployment of the airbag 12, the tension cloth 19 is stretched from the seatback 2b [sic] to the seat cushion 1a by cleaving open a skin of the vehicle seat 1, and retains a surface 12h of the airbag 12 on an opposite side from the surface 12g.

Embodiment 4 of Airbag Device: FIG. 6

The airbag device 11 illustrated in FIG. 6 is the airbag device 11 illustrated in FIG. 4 and FIG. 5 further provided with an extension chamber 12i, which is supplied with gas from the chamber 12c via an inner vent 20. The extension chamber 12i is a front surface 12j of the chamber 12c when only the chamber 12c is expanded and deployed (see FIG. 6(a)). Thereafter, when the extension chamber 12i is also expanded and deployed, the extension chamber 12i is provided at a position opposing the head region 2a of the occupant 2. (See FIG. 6(b)).

In the case of the airbag device 11 having the extension chamber 12i, for example, in the event of a frontal collision, the pair of chambers 12c first expand and deploy to restrain the side portion 2b of the occupant 2, as illustrated in FIG. 6(a). Thereafter, each extension chamber 12i supplied with gas through each chamber 12c expands and deploys in front of the head region 2a of the occupant 2 to restrain the head region 2a of occupant 2, as illustrated in FIG. 6(b). Therefore, the airbag 12 can restrain the head region 2a of the occupant 2 more reliably than the airbag 12 illustrated in FIG. 4 and FIG. 5, thereby achieving even higher occupant restraining performance.

The internal pressure of the extension chamber 12i can be appropriately adjusted adjusting the diameter of the inner vent 20. Furthermore, the extension chamber 12i may also not be a delayed chamber that is illustrated in FIG. 6, but may be configured to expand and deploy almost simultaneously with the chamber 12c.

Embodiment 5 of Airbag Device: FIG. 7

The airbag device 11 of the present invention illustrated in FIG. 7 has the extension chamber 12i on a forward side of the surface 12g of the chamber 12c opposing the side portion 2b of the occupant 2 during expansion and deployment.

Furthermore, in addition to the inner vent 20 described above, the extension chamber 12i illustrated in FIG. 7 has an outer vent 21 to discharge gas inside the extension chamber 12i. The outer vent 21 is provided at a position that satisfies the following two conditions:

A position where just after expansion and deployment, the outer vent 21 is covered by the expanded and deployed chamber 12c prior to the occupant 2 moving forward. (see FIG. 7(a)).

A position of the outer vent being exposed an open when the extension chamber 12i moves forward after expansion and deployment in conjunction with the occupant 2 moving forward (see FIG. 7(b))

In the case of the airbag device 11 with the extension chamber 12i, for example, before the occupant 2 moves forward immediately after the airbag 12 expands and deploys during a frontal collision, the outer vent 21 is closed as illustrated in FIG. 7(a). Therefore, the airbag 12 can maintain a high internal pressure to strongly restrain the side portion 2b of the occupant.

Thereafter, when the occupant 2 moves forward, and when the extension chamber 12i is pushed forward by the head region 2a, the outer vent 21 is open such that gas escapes, causing the internal pressure of the chamber 12c to decrease, as illustrated in FIG. 7(b). Therefore, the injury value to the occupant 2 is reduced, and thus safety is improved.

Method of Igniting Airbag Device: FIG. 8 to FIG. 11

A method of igniting Embodiment 1 of the airbag device 11 illustrated in FIG. 1 by a method of the present invention will be described below.

A feature of the present invention is that the ignition timing of the inflators 13 can be varied for the left and right sides depending on the seating position of the occupant 2 in the vehicle seat 1 or the collision position.

For example, as illustrated in FIG. 12, if an occupant state detection sensor (not shown) detects that the occupant 2 is seated in the vehicle seat 1 in a position offset to the right side from the regular state, the inflator 13 on the right side of the vehicle seat 1 is ignited at an earlier timing than the inflator 13 on the left side.

The occupant state detection sensor includes a detection apparatus capable of detecting the posture and seating position of the occupant 2, such as one or more pressure sensors internally provided in the vehicle seat 1 or an in-vehicle monitoring camera appropriately arranged in the cabin, and detects the position and posture of the seated occupant 2.

When the timing of igniting the inflator 13 is controlled as described above, the chamber 12c on the right side of the vehicle seat 1 expands and deploys before the chamber 12c on the left side of the vehicle seat 1. Therefore, even if the occupant 2 is seated offset to the right side from the regular state at an initial stage of expansion and deployment of the airbag 12, as illustrated in FIG. 9, the right side chambers 12c (side part protection chambers 12ca and head region protection chamber 12) will not get caught on the head region 2a or shoulder region of the occupant 2.

Thereafter, as illustrated in FIG. 10 to FIG. 11, the airbag 12 reliably expands and deploys, the head region protection chamber 12cb covers the head region 2a of the occupant 2 from above, and the side part protection chambers 12ca cover the side portion 2b of the shoulder region, upper arm region, and chest region to restrain lateral movement of the occupant 2.

"Regular state" as referred in the present invention refers to a case where the seating position is within a range indicated by the diagonal lines in FIG. 8. For example, if the seating position is within a trapezoidal range connecting points 150 mm away in the left-right direction (positions A and C in FIG. 8) from the regular position indicated by B in FIG. 8, and points 100 mm away in the left-right direction and 150 mm to the front (positions D and E in FIG. 8). The range indicated by the diagonal lines is approximately determined based on the volume of the airbag 12, the capacity of the inflator 13, and the time between impact detection of an impact detection sensor and the start of ignition of the inflator 13.

FIG. 9 to FIG. 11 describe a case where the occupant 2 is seated to the right side of the position indicated by "A" in FIG. 8, which is offset to the right side from the regular state, but the method of the present invention when the occupant 2 is seated at some other position is described using FIG. 8.

When the occupant state detection sensor detects that the seating position of the occupant 2 is in the regular state indicated by the diagonal lines in FIG. 8

In this case, even if the chambers 12c on both left and right sides of the vehicle seat 1 simultaneously deploy, the chambers 12c will not get caught on the head region 2a of the occupant 2 in the initial stage of expansion and deployment and inhibit the airbag 12 from expanding and deploying. Therefore, the inflators 13 on the right side and left side of the vehicle seat 1 are ignited at the same timing.

When the occupant state detection sensor detects that the seating position of the occupant 2 is to the left side from the position indicated by "C" in FIG. 8, which is offset to the left side from the regular state In this case, if the chambers 12c on both left and right sides of the vehicle seat 1 simultaneously expand and deploy, the chamber 12c on the left side may get caught on the head region 2a of the occupant in the initial stage of expansion and deployment and inhibit expansion and deployment of the airbag 12. Therefore, in this case, the inflator 13 disposed on the left side of the vehicle seat 1 is ignited at an earlier timing than the inflator 13 disposed on the right side of the vehicle seat 1.

When the occupant 2 is seated in the regular position indicated by "B" in FIG. 8 and a collision occurs from diagonally forward to the right outside the vehicle In this case, if the chambers 12c on both left and right sides of the vehicle seat 1 simultaneously expand and deploy, the chamber 12c on the right side may get caught on the head region 2a of the occupant in the initial stage of expansion and deployment and inhibit expansion and deployment of the airbag 12. Therefore, if the ECU determines that the occupant 2 is moving more to the right side than "D" in FIG. 8, which is diagonally forward to the right from the regular state, during expansion and deployment of the airbag 12 due to the collision (particularly from before the start of the expansion and deployment to the initial stage of the expansion and deployment until the airbag expands and deploys and starts to contact the occupant 2), the inflator 13 on the right side of the vehicle seat 1 is ignited at an earlier timing than the inflator 13 on the left side.

When the occupant 2 is seated in the regular position indicated by "B" in FIG. 8 and a collision occurs from diagonally forward to the left outside the vehicle In this case, if the chambers 12c on both left and right sides of the vehicle seat 1 simultaneously expand and deploy, the chamber 12c on the left side may get caught on the head region 2a of the occupant in the initial stage of expansion and deployment and inhibit expansion and deployment of the airbag 12. Therefore, if the ECU determines that the occupant 2 is moving more to the left side than "E" in FIG. 8, which is diagonally forward to the left from the regular state, during expansion and deployment of the airbag 12 due to the collision (particularly from before the start of the expansion and deployment to the initial stage of the expansion and deployment until the airbag expands and deploys and starts to contact the occupant 2), the inflator 13 on the left side of the vehicle seat 1 is ignited at an earlier timing than the inflator 13 on the right side.

When the occupant 2 is seated in the regular position indicated by "B" in FIG. 8 and a collision occurs from the right side of outside the vehicle In the case, if the ECU determines that the occupant 2 moves to a position more to the right side than "A" in FIG. 8, which is to the right side from the regular state, during expansion and deployment of the airbag 12 due to the collision (particularly from before the start of the expansion and deployment to the initial stage of the expansion and deployment until the airbag expands and deploys and starts to contact the occupant 2), the inflator 13 on the right side of the vehicle seat 1 is ignited at an earlier timing than the inflator 13 on the left side.

When the occupant 2 is seated in the regular position indicated by "B" in FIG. 8 and a collision occurs from the left side of outside the vehicle In the case, if the ECU determines that the occupant 2 moves to a position more to the left side than "C" in FIG. 8, which is to the left side from the regular state, during expansion and deployment of the airbag 12 due to the collision (particularly from before the start of the expansion and deployment to the initial stage of the expansion and deployment until the airbag expands and deploys and starts to contact the occupant 2), the inflator 13 on the left side of the vehicle seat 1 is ignited at an earlier timing than the inflator 13 on the right side.

In the method of the present invention described above, when one inflator 13 on either left or right side is ignited at an earlier timing than the inflator 13 on the other side, the difference in ignition timing may be set in advance, but may also be appropriately changed in accordance with the degree of offset and degree of the impact on the vehicle.

Control of the ignition timing of the inflator 13 is controlled by the ECU, which controls expansion and deployment of the airbag 12 based on output signals from a plurality of various sensors mounted in the vehicle.

As one specific example, a table is prepared in the ECU for expanding and deploying the airbag 12 at an ideal timing based on the form of collision. The table stores the appropriate individual ignition timing for each inflator 13 based on the seating position and posture of the occupant 2, form of the collision, and the like, as detected based on outputs from various sensors. The ECU determines the form of collision and the state of the occupant 2 (posture, position, and the like) based on output signals of the intensity, direction, and the like of the collision transmitted from the collision detection sensors and output signals indicating the seating position and posture of the occupant 2 transmitted from the occupant state detection sensor. Based on the determination results, the ignition timing of the second inflator 13 is delayed by several milliseconds to several hundred milliseconds relative to the first inflator 13 to be ignited first.

In the case of a typical side collision, the delay (difference) in ignition timing is preferably between a few milliseconds and a hundred milliseconds. However, the ideal ignition timing (delay, difference) varies greatly depending on the form of collision, and therefore, the ignition timing can be significantly varied up to a few hundred milliseconds depending on the form of collision.

Needless to say, the present invention is not limited to the aforementioned examples and the embodiments may be appropriately changed within the scope of the technical concepts described in each claim.

In other words, the airbag device and the like described above are preferred examples of the present invention, and embodiments other than those described may also be implemented or executed via a variety of methods. Unless otherwise specified in the specification of the present application, there are no limitations to the shape, size, configuration, arrangement, and the like of the components illustrated in the attached drawings in the present invention. Furthermore, expressions and terms used in the specification of the present application are for the purpose of description and are not limiting unless otherwise specified.

Furthermore, the airbags 12 illustrated in FIG. 1 and FIG. 3 are provided with gas guide 18. However, the gas guide 18 may be omitted so long as the gas from the inflator 13 is reliably guided to the side part protection chambers 12ca, head region protection chamber 12cb, and expansion region 12fb.

Furthermore, the airbag devices 11 that protect the head region 2a of the occupant 2 and the side portion 2b of the shoulder region, upper arm region, and chest region of the occupant 2 are described in the embodiments illustrated in FIG. 1 to FIG. 3 and FIG. 9 to FIG. 11. However, the present invention may be applied to an airbag device that protects the head region 2a of the occupant 2 and the side portion 2b of the abdomen region and waist region of the occupant 2 in addition to the shoulder region, upper arm region, and chest region. Furthermore, in the case of the embodiments illustrated in FIG. 4 to FIG. 7, the chamber 12c (side part protection chambers 12ca) may restrain not only the side portions 2b of the shoulder region, upper arm region, and chest region of the occupant 2, but also the side portion 2b of the abdomen region and waist region of the occupant 2.

Furthermore, in Embodiment 3 to Embodiment 5 of the airbag device 11 illustrated in FIG. 4 to FIG. 7, the tension cloth fabric 19 retains the surface 12h on the opposite side of the airbag 12 from the occupant 2. However, if the movement of the occupant 2 can be restrained in the event of a collision or the like, the tension cloth 19 may be eliminated.

Furthermore, the airbag device 11 of the present invention is not limited to mounting the side part protection chambers 12ca to an outer side of the frame 1d in the left-right direction when housing the airbag 12 in, for example, the seatback 1b of the vehicle seat 1, and may be mounted to an inner side of the frame 1d in the left-right direction. Furthermore, the inflator 13 may also be mounted on either the inner side or outer side of the frame 1d in the left-right direction.

Furthermore, the airbag 12 described in FIG. 1 and FIG. 3 is formed by stitching two sheets together, but may also be formed using a so-called "one-piece weaving" technique.

DESCRIPTION OF CODES

1: Vehicle seat
1b: Seatback
2: Occupant
2a: Head region
2b: Side portion
11: Airbag device
12: Airbag
12c: Chamber
12ca: Side part protection chamber
12cb: Head region protection chamber
12d: Coupling part
12g: Surface relative to the side part of the occupant
12i: Extension chamber
13: Inflator

The invention claimed is:

1. An airbag device, the airbag device comprising:
an airbag for protecting at least a side portion of a shoulder region, upper arm region, and chest region for an occupant seated on a vehicle seat, the airbag including first and second side part protection chambers housed on first and second lateral sides of the vehicle seat, respectively; and
first and second inflators for providing gas to the first and second side part protection chambers, respectively; wherein
the first and second side part protection chambers, when expanded and deployed, expand and deploy forward independently from the first and second lateral sides of the vehicle seat, respectively,
wherein the airbag device is operative when an occupant state detection sensor detects that a seating position of an occupant is offset to the first lateral side of a regular state to ignite the first inflator on the first lateral side of the vehicle seat earlier than the second inflator disposed on the second lateral side of the vehicle seat and operative when an occupant state detection sensor detects that the seating position of an occupant is offset to the second lateral side of the regular state to ignite the second inflator on the second lateral side of the vehicle seat earlier than the first inflator disposed on the first lateral side of the vehicle seat, and
wherein a time difference in ignition timings between the first inflator and the second inflator depends on a degree of offset of the occupant.

2. The airbag device according to claim 1, wherein the airbag further includes a head region protection chamber that expands and deploys from above the first side part protection chamber that protects the occupant so as to wrap around an upper end edge portion of a seatback of the vehicle seat in a vicinity of the upper end edge portion to protect the head region of the occupant.

3. The airbag device according to claim 1, wherein the first and second side part protection chambers of the airbag have a shape in which a distance between the occupant side surfaces narrows toward a front when viewed from above during expansion and deployment.

4. The airbag device according to claim 1, wherein the first and second side part protection chambers of the airbag both further include an extension chamber leading from the respective side part protection chamber.

5. The airbag device according to claim 3, wherein the first and second side part protection chambers of the airbag both further include an extension chamber leading from the respective side part protection chamber.

6. The airbag device according to claim 1, wherein the first and second side part protection chambers of the airbag are physically connected to one another via a coupling part.

7. The airbag device according to claim 2, wherein the first and second side part protection chambers of the airbag are physically connected to one another via a coupling part.

8. The airbag device according to claim 3, wherein the first and second side part protection chambers of the airbag are physically connected to one another via a coupling part.

9. The airbag device according to claim 4, wherein the first and second side part protection chambers of the airbag are physically connected to one another via a coupling part.

10. The airbag device according to claim 5, wherein the first and second side part protection chambers of the airbag are physically connected to one another via a coupling part.

11. The airbag device of claim 1 in combination with the vehicle A-vehicle seat, wherein the first and second side part protection chambers of the airbag device are arranged separated but facing each other on both the first and second lateral sides of the vehicle seat, and are housed in the vehicle seat in a rolled state or folded state.

12. An ignition method for the airbag device according to claim 1, the ignition method comprising igniting the first and second ignitors at a same time when the occupant state detection sensor detects that the seating position of the occupant is in a regular state.

13. An ignition method for the airbag device according to claim 1, the ignition method comprising igniting the first inflator earlier than the second inflator when the collision detection sensor detects a collision from a side outside the vehicle and determines that a collision will cause the occupant to move to a position that is offset toward the first side from the regular state.

14. An ignition method for the airbag device according to claim 1, the ignition method comprising igniting the first inflator earlier than the second inflator when the collision detection sensor detects a collision from diagonally forward outside the vehicle and determines that the collision will cause the occupant to move to a position that is offset diagonally forward and toward the first lateral side from the regular state when the airbag is expanded and deployed.

15. The ignition method of the airbag device according to claim 13, wherein a time difference in ignition timing between the first inflator and the second inflator depends on a degree of the impact acting on the vehicle.

16. The ignition method of the airbag device according to claim 14, wherein a time difference in ignition timing between the first inflator and the second inflator depends on the degree of the impact acting on the vehicle.

* * * * *